United States Patent
Shinozaki et al.

(10) Patent No.: US 12,534,851 B2
(45) Date of Patent: Jan. 27, 2026

(54) ARTIFICIAL LEATHER AND LIGHT-TRANSMITTING DEVICE FABRICATED USING THE SAME

(71) Applicant: Toray Industries, Inc., Tokyo (JP)

(72) Inventors: Atsushi Shinozaki, Osaka (JP); Konomi Sakagami, Osaka (JP); Takahiro Tsuchimoto, Osaka (JP)

(73) Assignee: Toray Industries, Inc., Tokyo (JP)

( * ) Notice: Subject to any disclaimer, the term of this patent is extended or adjusted under 35 U.S.C. 154(b) by 159 days.

(21) Appl. No.: 18/024,828

(22) PCT Filed: Sep. 16, 2021

(86) PCT No.: PCT/JP2021/034124
§ 371 (c)(1),
(2) Date: Mar. 6, 2023

(87) PCT Pub. No.: WO2022/070953
PCT Pub. Date: Apr. 7, 2022

(65) Prior Publication Data
US 2023/0313447 A1 Oct. 5, 2023

(30) Foreign Application Priority Data
Sep. 29, 2020 (JP) .............................. 2020-163353

(51) Int. Cl.
*D06N 3/00* (2006.01)
*D06N 3/14* (2006.01)

(52) U.S. Cl.
CPC .......... D06N 3/0065 (2013.01); D06N 3/0004 (2013.01); D06N 3/0006 (2013.01); D06N 3/0011 (2013.01); D06N 3/0027 (2013.01); D06N 3/14 (2013.01); *D06N 2201/02* (2013.01); *D06N 2209/0823* (2013.01); *D06N 2211/28* (2013.01)

(58) Field of Classification Search
CPC ........... Y10T 428/24942; Y10T 428/31; Y10S 428/904; B32B 5/00; B32B 5/02; B32B 5/022; B32B 5/024; B32B 5/026; B32B 7/00; B32B 7/02; B32B 7/023; B32B 33/00; D06N 3/00; D06N 3/0002; D06N 3/0006; D06N 3/0009; D06N 3/0011; D06N 3/0015; D06N 3/04; D06N 3/042; D06N 3/045; D06N 3/10; D06N 3/106; D06N 3/12; D06N 3/121; D06N 3/123; D06N 3/14; D06N 2201/00; D06N 2201/02; D06N 2201/0245; D06N 2201/0254; D06N 2201/0263; D06N 2201/0281; D06N 2209/09; D06N 2209/0807; D06N 2209/0815; D06N 2209/16
USPC ....................... 428/212, 409, 904
See application file for complete search history.

(56) References Cited

U.S. PATENT DOCUMENTS

| | | | |
|---|---|---|---|
| 2017/0022659 A1* | 1/2017 | Masaki ................ | D06N 3/0034 |
| 2019/0073055 A1 | 3/2019 | Nakai et al. | |
| 2019/0135199 A1* | 5/2019 | Galan Garcia ........ | B60K 35/00 |
| 2020/0291571 A1* | 9/2020 | Fujisawa ................ | B32B 27/32 |
| 2020/0332461 A1* | 10/2020 | Hayashi ................ | B60K 35/22 |
| 2022/0064852 A1 | 3/2022 | Warita et al. | |

FOREIGN PATENT DOCUMENTS

| | | |
|---|---|---|
| CN | 106133237 A | 11/2016 |
| CN | 109661491 A | 4/2019 |
| CN | 111279118 A | 6/2020 |
| EP | 0165345 A1 | 6/1984 |
| EP | 3 427 941 A1 | 1/2019 |
| JP | 5711280 A | 1/1982 |
| JP | 59150133 A | 8/1984 |
| JP | 2002242085 A | 8/2002 |
| JP | 2003071956 A | 3/2003 |
| JP | 2004308044 A | 11/2004 |
| JP | 2013177714 A * | 9/2013 |
| JP | 2014185404 A | 10/2014 |
| JP | 2017106127 A * | 6/2017 |
| JP | 2018127736 A | 8/2018 |
| JP | 2019183351 A | 10/2019 |

(Continued)

OTHER PUBLICATIONS

Machine translation (Espacenet) of JP 2017-106127 A. Translated Jan. 25, 2025. (Year: 2025).*
Machine translation (Espacenet) of JP 2013-177714 A. Translated Nov. 29, 2025. (Year: 2025).*
Office Action (Examination Report) issued Sep. 3, 2024, by the Taiwan Intellectual Property Office in corresponding Taiwanese Patent Application No. 110135729 and an English translation of the Office Action. (11 pages).
Office Action (Notification of the Second Office Action) issued Sep. 26, 2024, by the National Intellectual Property Administration, P. R. China in corresponding Chinese Patent Application No. 202180063338.X and an English translation of the Office Action. (12 pages).

(Continued)

Primary Examiner — Maria V Ewald
Assistant Examiner — Ethan A. Utt
(74) Attorney, Agent, or Firm — Buchanan Ingersoll & Rooney PC

(57) ABSTRACT

Provided is an artificial leather, which exhibits light transmitting properties and maintains its texture and touch while being dark-colored and having a medium or higher density, the artificial leather including a fiber entangled body formed of ultrafine fibers having an average single fiber diameter of 0.1 to μm; and an elastomer, in which the artificial leather has a thickness of 0.4 to 1.2 mm and a weight per unit area of 80 to 450 g/m², where one surface of the artificial leather is a design surface colored with a dye and/or a pigment and satisfies the following Formulas (1) to (3):

$$L^*_1 \leq 55 \ldots \tag{1}$$

$$L_0 > 50 \ldots \tag{2}$$

$$\Delta L^* < -5 \ldots \tag{3}$$

where $L^*_1$, $L^*_0$ and $\Delta L^*$ are as defined.

5 Claims, No Drawings

(56) References Cited

FOREIGN PATENT DOCUMENTS

| KR | 101680627 B1 | 11/2016 | |
|---|---|---|---|
| KR | 10-2018-0120681 A | 11/2018 | |
| TW | 202028566 A | 8/2020 | |
| WO | 2017154904 A1 | 9/2017 | |
| WO | WO-2019087949 A1 * | 5/2019 | ............. B60K 35/22 |

OTHER PUBLICATIONS

The First Office Action issued Apr. 26, 2024 by the State Intellectual Property Office of People's Republic of China in corresponding Chinese Patent Application No. 202180063338.X and an English translation of the Office Action (10 pages).

International Search Report and Written Opinion for International Application No. PCT/JP2021/034124, dated Nov. 30, 2021, 7 pages.

The extended European Search Report issued Nov. 5, 2024, by the European Patent Office in corresponding European Patent Application No. 21875255.8-1102. (86 pages).

Office Action (Request for the Submission of an Opinion) issued Jun. 30, 2025, by the Korean Intellectual Property Office in corresponding Korean Patent Application No. 10-2023-7006204 and an English translation of the Office Action. (11 pages).

Office Action (Notice of Reasons for Refusal) issued Sep. 2, 2025, by the Japan Patent Office in corresponding Japanese Patent Application No. 2021-557864 and an English translation of the Office Action. (8 pages).

* cited by examiner

ARTIFICIAL LEATHER AND LIGHT-TRANSMITTING DEVICE FABRICATED USING THE SAME

CROSS REFERENCE TO RELATED APPLICATIONS

This application is the U.S. National Phase application of PCT/JP2021/034124, filed Sep. 16, 2021 which claims priority to Japanese Patent Application No. 2020-163353, filed Sep. 29, 2020, the disclosures of these applications being incorporated herein by reference in their entireties for all purposes.

FIELD OF THE INVENTION

The present invention relates to artificial leather and a light-emitting transmitting device fabricated using the same.

BACKGROUND OF THE INVENTION

Suede-like artificial leather made of ultrafine fibers and elastomers exhibits excellent properties in terms of durability and uniformity that natural leather does not exhibit. Taking advantage of these characteristics, suede-like artificial leather has been used in a wide range of applications such as clothing, furniture, and interior materials for motor vehicles. In recent years, needs for further diversification have arisen, and suede-like artificial leather is being studied as various upholstery materials for home appliances, consoles of motor vehicles, and the like.

In such an environment, in home appliances and consoles of motor vehicles in recent years, the number of light-transmitting devices having backlight buttons (keyboards) that themselves emit light in terms of designability has increased. Techniques for using suede-like artificial leather, which has been conventionally used for such light-transmitting devices, as an upholstery material have been proposed (see Patent Documents 1 and 2, for example).

PATENT DOCUMENTS

Patent Document 1: Japanese Patent Laid-open Publication No. 2003-71956
Patent Document 2: Japanese Patent Laid-open Publication No. 2014-185404

SUMMARY OF THE INVENTION

In general, when artificial leather is used as an upholstery material, particularly medium- and dark-colored artificial leather having a lightness index (hereinafter simply referred to as L* value in some cases) in the CIE1976 L*a*b* color space of 50 or less exhibits poor light transmitting properties and may not transmit light depending on conditions such as the color of the artificial leather and the amount of light from the light source. Therefore, in the techniques disclosed in Patent Documents 1 and 2, a cutout portion is provided or a light-transmitting portion formed by filming a nonwoven fabric is provided so that the part, which substantially blocks light, is not provided. However, in the case of such techniques, since the artificial leather is removed or fused at the part where light is desired to be transmitted, there is a problem that the texture, touch, and quality of artificial leather are impaired.

The present invention has been made in view of the above circumstances, and an object thereof is to provide artificial leather, which exhibits light transmitting properties as well as maintains its texture and touch while being dark-colored artificial leather having medium or higher density, and a light-transmitting device fabricated using the same.

The present inventors have conducted intensive studies to achieve the object, and as a result, have attained the knowledge that artificial leather exhibits light transmitting properties as well as maintains texture and touch as artificial leather without providing a cutout portion or a light-transmitting portion formed by filming a nonwoven fabric by setting the color difference between the design surface and the opposite surface of artificial leather having specific thickness and weight per unit area to a specific range. Surprisingly, it has also been found that the artificial leather exhibits sufficient light transmitting properties when used as a light-transmitting device in a case where the design surface of this artificial leather is a dark color.

The present invention has been completed based on these findings. The present invention provides the following inventions.

The artificial leather of the present invention is artificial leather including a fiber entangled body formed of ultrafine fibers having an average single fiber diameter of 0.1 µm or more and 8 µm or less; and an elastomer as constituent elements, in which the artificial leather has a thickness of 0.4 mm or more and 1.2 mm or less and a weight per unit area of 80 g/m² or more and 450 g/m² or less, and one surface of the artificial leather is a design surface colored with a dye and/or a pigment and satisfies the following Formulas (1) to (3):

$$L^*_1 \leq 55 \ldots \quad (1)$$

$$L^*_0 > 50 \ldots \quad (2)$$

$$\Delta L^* < -5 \ldots \quad (3)$$

where $L^*_1$ is the lightness index (L* value) of the design surface in the CIE1976L*a*b* color space, $L^*_0$ is the lightness index (L* value) of the surface opposite to the design surface in the CIE1976L*a*b* color space, and $\Delta L^*$ is the difference (CIELAB 1976ab lightness difference, $L^*_1 - L^*_0$) between the L* value of the design surface and the L* value of the surface opposite to the design surface. The lightness index is a value measured under conditions of CIE standard light source D65 and a viewing angle of 10°.

According to a preferred aspect of the artificial leather of the present invention, the fiber entangled body is dyed with a dye.

The light-transmitting device of the present invention includes at least one light source and the artificial leather at least as constituent elements, and the artificial leather is disposed on the light source.

According to the present invention, artificial leather is obtained which exhibits excellent light transmitting properties as well as maintains texture and touch as artificial leather. In particular, the artificial leather of the present invention exhibits excellent light transmitting properties while being medium- or dark-colored artificial leather that conventionally exhibits poor light transmitting properties, and can be thus suitably used for home appliances, consoles of motor vehicles, and the like. In particular, in the case of being made into napped artificial leather, the artificial leather can be made into artificial leather with a high-grade sense, which exhibits excellent light transmitting properties as well as maintains nap touch and texture of suede leather, and can be effectively used for the applications.

DETAILED DESCRIPTION OF EMBODIMENTS OF THE INVENTION

The artificial leather of the present invention is artificial leather including a fiber entangled body formed of ultrafine fibers having an average single fiber diameter of 0.1 μm or more and 8 μm or less; and an elastomer as constituent elements, in which the artificial leather has a thickness of 0.4 mm or more and 1.2 mm or less and a weight per unit area of 80 g/m² or more and 450 g/m² or less, and one surface of the artificial leather is a design surface colored with a dye and/or a pigment and satisfies the following Formulas (1) to (3):

$$L^*_1 \leq 55 \ldots \quad (1)$$

$$L^*_0 > 50 \ldots \quad (2)$$

$$\Delta L^* < -5 \ldots \quad (3)$$

where $L^*_1$ is the lightness index (L* value) of the design surface in the CIE1976L*a*b* color space, $L^*_0$ is the lightness index (L* value) of the surface opposite to the design surface in the CIE1976L*a*b* color space, and $\Delta L^*$ is the difference (CIELAB 1976ab lightness difference, $L^*_1 - L^*_0$) between the L* value of the design surface and the L* value of the surface opposite to the design surface. The lightness index is a value measured under conditions of CIE standard light source D65 and a viewing angle of 10°. Hereinafter, the constituent elements of the artificial leather will be described in detail, but the present invention is not limited to the scope described below at all as long as the gist thereof is not exceeded.

[Ultrafine Fiber]

The ultrafine fibers forming the fiber entangled body, which is one of the constituent elements of the artificial leather of the present invention, have an average single fiber diameter of 0.1 μm or more and 8 μm or less. By setting the average single fiber diameter to 0.1 μm or more, preferably 0.2 μm or more, more preferably 0.3 μm or more, artificial leather having a favorable color fastness is obtained, and artificial leather having a particularly favorable color fastness to light is obtained. By setting the average single fiber diameter to 8.0 μm or less, preferably 4.0 μm or less, more preferably 2.0 μm or less, artificial leather having favorable texture is obtained.

The average single fiber diameter of ultrafine fibers is calculated by the following method.

In the present invention, a value measured and calculated as follows is adopted as the average single fiber diameter of ultrafine fibers.

(1) The fiber entangled body is cut to expose a cross section in the thickness direction, which serves as an observation surface.

(2) Images of the cross section in the thickness direction are taken using a scanning electron microscope (SEM).

(3) Randomly 100 circular or (nearly circular) elliptical ultrafine fibers are selected.

(4) The single fiber diameters of the selected ultrafine fibers are measured, and the number average value thereof is calculated.

As the ultrafine fibers of the present invention, various synthetic fibers formed of polymers such as polyesters including polyethylene terephthalate, polybutylene terephthalate, polytrimethylene terephthalate, polyethylene 2,6-naphthalene dicarboxylate, polyamides including 6-nylon and 66-nylon, acryl, polyethylene and polypropylene can be used. Among these, polyester fibers formed of polymers such as polyethylene terephthalate, polybutylene terephthalate and polytrimethylene terephthalate, and the like are excellent in strength, dimensional stability, light resistance and coloring properties and are thus preferably used. Ultrafine fibers formed of different materials can be mixed in the fiber entangled body as long as the object of the present invention is not impaired.

Inorganic particles such as titanium oxide particles, a lubricant, a pigment, a thermal stabilizer, an ultraviolet absorber, a conductive agent, a heat storage agent, an antibacterial agent, and the like can be added to the ultrafine fibers forming the fiber entangled body according to various purposes.

As the cross-sectional shape of the ultrafine fibers forming the fiber entangled body, cross-sectional shapes of modified cross sections such as elliptical, flat, polygonal such as triangular, fan-shaped and cross-shaped cross sections in addition to circular cross sections may be adopted.

[Fiber Entangled Body]

The fiber entangled body, which is one of the constituent elements of the artificial leather of the present invention, is formed of the ultrafine fibers described above.

Examples of the form of the fiber entangled body include a woven fabric, a knitted fabric, a nonwoven fabric, and fiber entangled bodies in which an elastomer is filled in the fiber structures thereof, and these may be properly used depending on the cost and properties required for each application and purpose. Woven and knitted fabrics are preferably used from the viewpoint of cost, and nonwoven fabrics, fiber entangled bodies filled with an elastomer, and the like are preferably used from the viewpoint of texture with a sense of fulfillment and quality due to fine naps.

In the case of using a woven or knitted fabric as the fiber entangled body, examples of the woven fabric include plain woven fabrics, twill woven fabrics, satin woven fabrics, and various woven fabrics based on these weave structures. As the knitted fabric, any of warp knitted fabrics, weft knitted fabrics represented by tricot knit fabrics, lace knit fabrics, and various knitted fabrics based on these knitting structures may be adopted.

In the case of using a nonwoven fabric as the fiber entangled body, all nonwoven fabrics described in various categories may be applied, such as general short fiber nonwoven fabrics, long fiber nonwoven fabrics, needle punch nonwoven fabrics, papermaking nonwoven fabrics, spunbond nonwoven fabrics, meltblown nonwoven fabrics and electrospun nonwoven fabrics. Here, a nonwoven fabric is preferable from the viewpoint of the texture with a sense of fulfillment and the quality due to fine naps.

Fiber entangled bodies in which an elastomer is filled in these fiber entangled bodies are more preferably used from the viewpoint of durability of the artificial leather and wear resistance of the surface of the artificial leather.

Furthermore, it is a preferred aspect that the artificial leather of the present invention contains a woven or knitted fabric inside its structure from the viewpoint of excellent mechanical strength.

In a case where the fiber entangled body contains a woven or knitted fabric, as the yarn forming the woven or knitted fabric, synthetic fibers formed of polyester, polyamide, polyethylene, polypropylene, or copolymers thereof are preferably used. Among these, synthetic fibers formed of polyester, polyamide and copolymers thereof may be used singly or in combination or in mixture. As the yarns forming the woven or knitted fabric, filament yarns, spun yarns, blended yarns of filaments and short fibers, and the like may be used.

As the woven or knitted fabric contained in the fiber entangled body, a woven or knitted fabric containing a composite fiber (hereinafter, described as a side-by-side composite fiber in some cases) in which two or more kinds of polymers are combined in a side-by-side or eccentric sheath-core type may also be used. For example, in a side-by-side composite fiber formed of two or more kinds of polymers having different intrinsic viscosities (IV), different internal strains are generated between the two components by stress concentration on the high viscosity side during drawing Because of this internal strain, the high viscosity side shrinks greatly by the difference in elastic recovery after drawing and the difference in thermal shrinkage in the heat treatment process, and strain is generated in the single fiber to develop a three-dimensional coil type crimp. By this three-dimensional coil type crimp, stretchability as artificial leather is developed.

The woven fabrics contained in the fiber entangled body include plain woven fabrics, twill woven fabrics, satin woven fabrics, and various woven fabrics based on these weave structures as described above. As the knitted fabric, any of warp knitted fabrics, weft knitted fabrics represented by tricot knit fabrics, lace knit fabrics, and various knitted fabrics based on these knitting structures may be adopted. Among these, woven fabrics are preferable from the viewpoint of workability, and plain woven fabrics are particularly preferably used from the viewpoint of cost. The weave density of the woven fabric can be appropriately set depending on the total fineness of the line of thread and the equipment and conditions for entangling the nonwoven fabric and the woven or knitted fabric to be described later.

In the artificial leather of the present invention, the fiber entangled body is also preferably dyed with a dye. By decreasing the color difference between the fiber entangled body and the design surface as much as possible in this way, in the case where the artificial leather of the present invention is viewed from the design surface, flickering due to the color on the opposite side of the design surface is suppressed, and a sense of unity of the overall hue is acquired. The "color difference" as used herein refers to the difference between the a* and b* values in the CIE1976L*a*b* color space, and both the $\Delta a^*$ and $\Delta b^*$ values are preferably within ±20, more preferably within ±10. The color difference is a value measured under the conditions of CIE standard light source D65 and a viewing angle of 10°. A sense of unity of hue is acquired by using the same hue as that of the design surface. The $\Delta a^*$ value and $\Delta b^*$ value as used herein are values determined by a method to be described later.

[Elastomer]

In the artificial leather of the present invention, as described above, the morphological stability of the artificial leather and the wear resistance of the surface are improved by containing an elastomer inside the fiber entangled body. In a case of containing an elastomer inside the fiber entangled body, polyurethane, styrene-butadiene rubber (SBR), nitrile rubber (NBR), acrylic resin and the like may be used as the elastomer, and it is a preferred aspect to use polyurethane as the main component among these. Use of polyurethane can afford artificial leather having touch with a sense of fulfillment, a leather-like appearance, and physical properties enough to endure actual use.

In the case where polyurethane is used as the elastomer contained inside the fiber entangled body, both organic solvent-based polyurethane used in the state of being dissolved in an organic solvent and water-dispersible polyurethane used in the state of being dispersed in water may be adopted. As the polyurethane, polyurethane obtained by a reaction of a polymer diol, an organic diisocyanate, and a chain extender is preferably used.

The elastomer inside the fiber entangled body may contain various additives including pigments such as carbon black; flame retardants such as phosphorus, halogen, and inorganic flame retardants; antioxidants such as phenolic, sulfur, and phosphorus antioxidants; ultraviolet absorbers such as benzotriazole, benzophenone, salicylate, cyanoacrylate, and oxalic acid anilide ultraviolet absorbers; light stabilizers such as hindered amine and benzoate light stabilizers; hydrolysis stabilizers such as polycarbodiimide; plasticizers; antistatic agents; surfactants; coagulation modifiers; and dyes.

The content of the elastomer inside the fiber entangled body may be appropriately adjusted in consideration of the kind of the elastomer used, the method for producing the elastomer, and the texture and physical properties. The content of the elastomer is preferably 5% by mass or more and 80% by mass or less, more preferably 10% by mass or more and 60% by mass or less, still more preferably 15% by mass or more and 45% by mass or less with respect to the mass of the fiber entangled body. By setting the content ratio of the elastomer to 5% by mass or more, it is possible to acquire sheet strength and to maintain the entangled state by binding the fibers. By setting the content ratio to 80% by mass or less, it is possible to prevent the texture from becoming hard.

[Artificial Leather]

The artificial leather of the present invention contains the fiber entangled body and the elastomer as constituent elements.

The artificial leather of the present invention has a thickness of 0.4 mm or more and 1.2 mm or less. By setting the thickness of the artificial leather to 0.4 mm or more, preferably 0.5 mm or more, more preferably 0.6 mm or more, the strength and elongation required for artificial leather may be acquired. By setting the thickness to 1.2 mm or less, preferably 1.0 mm or less, more preferably 0.8 mm or less, the artificial leather is likely to exhibit light transmitting properties that are the object of the present invention.

The thickness of the artificial leather refers to a value that is measured and calculated according to the following procedure in conformity with "8.4 Thickness A method" of JIS L1096:2010 "Testing methods for woven and knitted fabrics".

(1) The sample for measurement is adjusted in a state where the sample is preliminary dried in an environment with a relative humidity of 10% to 25% and a temperature of less than 50° C. and then left in a room under standard conditions to have a constant weight.

(2) The thickness (mm) is measured at five different locations of the adjusted sample for 10 seconds at a pressure of 0.7 kPa using a thickness measuring instrument, and the average value thereof is calculated and rounded to two decimal places.

The artificial leather of the present invention has a weight per unit area of 80 $g/m^2$ or more and 450 $g/m^2$ or less. By setting the weight per unit area of the artificial leather to 80 $g/m^2$ or more, preferably 100 $g/m^2$ or more, more preferably 120 $g/m^2$ or more, the artificial leather exhibits durability. By setting the weight per unit area to 450 $g/m^2$ or less, preferably 400 $g/m^2$ or less, more preferably 350 $g/m^2$ or less, the artificial leather is likely to exhibit light transmitting properties that are the object of the present invention.

The weight per unit area of the artificial leather refers to a value that is measured and calculated according to the following procedure in conformity with "8.3.2 Mass per unit area under standard conditions A method" of JIS L1096: 2010 "Testing methods for woven and knitted fabrics".

(1) In a state where the sample for measurement is preliminary dried in an environment with a relative humidity of 10% to 25% and a temperature of less than 50° C. and then left in a room under standard conditions to have a constant weight, two test pieces of about 200 mm×200 mm are sampled, the mass (g) of each is measured in the standard state, the mass (g/m²) per 1 m² is determined by the following equation, and the average value thereof is calculated and round to one decimal place.

$$Sm = W/A$$

where

Sm is the mass per unit area under the standard state (g/m²),

W is the mass of the test piece in the standard state (g), and

A is the area of the test piece (m²).

One surface of the artificial leather of the present invention is a design surface colored with a dye and/or a pigment, and satisfies the following Formulas (1) to (3):

$$L^*_1 \leq 55 \ldots \quad (1)$$

$$L^*_0 > 50 \ldots \quad (2)$$

$$\Delta L^* < -5 \ldots \quad (3)$$

where $L^*_1$ is the lightness index (L* value) of the design surface in the CIE1976L*a*b* color space, $L^*_0$ is the lightness index (L* value) of the surface opposite to the design surface in the CIE1976L*a*b* color space, and $\Delta L^*$ is the difference (CIELAB 1976ab lightness difference, $L^*_1 - L^*_0$) between the L* value of the design surface and the L* value of the surface opposite to the design surface. The lightness index is a value measured under conditions of CIE standard light source D65 and a viewing angle of 10°.

In other words, $L^*_1 \leq 55$ as shown in Formula (1) means that the design surface is a medium dark color to a dark color. According to the present invention, it is possible to obtain artificial leather exhibiting excellent light transmitting properties while being a dark color such as $L^*_1 \leq 30$.

$L^*_0 > 50$ as shown in Formula (2) means that the color is lighter than that of the design surface when measured on the surface opposite to the design surface. It is possible to improve the light transmitting properties of a dark colored design surface as the formula $\Delta L^* < -5$ shown in Formula (3) is satisfied, that is, the color difference due to $\Delta L^*$ is a certain level or more.

$L^*_0 > 50$ is preferably $L^*_0 > 60$, more preferably $L^*_0 > 70$. The upper limit is preferably $L^*0 \leq 90$ from the viewpoint of designability, that is, so that the design surface is unlikely to be affected by the hue on the opposite side of the design surface.

$\Delta L^* < -5$ is preferably $\Delta L^* < -10$, more preferably $\Delta L^* < -15$.

[Method for Producing Artificial Leather]

Here, the method for producing the artificial leather of the present invention will be described. The artificial leather of the present invention can be obtained, for example, using ultrafine fiber-generating fibers composed of two or more kinds of polymer substances exhibiting different solubility in a solvent.

As the ultrafine fiber-generating fibers, island-in-sea composite fibers that contain two thermoplastic resins with different solubility in a solvent as a sea component and an island component, in which the sea component is dissolved and removed using a solvent to form the island component into ultrafine fibers; splittable composite fibers that are obtained by alternately disposing two thermoplastic resins radially or in layers on the fiber surface and splitting and separating the components by the treatment with a solvent to form ultrafine fibers; and the like may be adopted. Among these, island-in-sea composite fibers are preferably used from the viewpoint of flexibility of the base material and texture since it is possible to provide proper voids between the island components, namely, between the ultrafine fibers inside the fiber bundle by removing the sea component.

For production of island-in-sea composite fibers, it is possible to use an island-in-sea composite spinneret and a mutually aligned polymer array system in which two components, a sea component and an island component, are mutually aligned and spun, a blend spinning system in which two components, a sea component and an island component, are mixed and spun, and the like, but a production method of island-in-sea composite fibers by the aligned polymer array system is more preferably used from the viewpoint of obtaining ultrafine fibers having a uniform fineness.

It is a preferred aspect that the ultrafine fibers are in the form of a nonwoven fabric (ultrafine fiber web) in the fiber entangled body. Such a nonwoven fabric may afford uniform and elegant appearance and texture. The form of the nonwoven fabric (ultrafine fiber web) may be either a short fiber nonwoven fabric or a long fiber nonwoven fabric.

The fiber length of the ultrafine fibers in the case of a short fiber nonwoven fabric can be appropriately selected depending on the form of the nonwoven fabric. The fiber length in the case of a common short fiber nonwoven fabric is preferably 25 mm or more and 90 mm or less. By setting the fiber length of the ultrafine fibers to 90 mm or less, favorable quality and texture are acquired. By setting the fiber length to 25 mm or more, artificial leather exhibiting favorable wear resistance may be obtained. The fiber length in the case of a nonwoven fabric fabricated by a papermaking method is preferably 0.1 mm or more and 10 mm or less. By setting the fiber length to 10 mm or less, it is possible to obtain a stable suspension and to suppress unevenness in the weight per unit area and thickness of the nonwoven fabric. By setting the fiber length to 0.1 mm or more, it is possible to suppress fluff falling from the nonwoven fabric. The ultrafine fiber-generating fibers of the present invention are preferably crimped in order to promote the entanglement of fibers. Known methods may be used for the crimping and cutting.

Next, the obtained raw stock is processed by a cross lapper or the like to fabricate a fiber web, which is then subjected to fiber entangling treatment to afford a nonwoven fabric. As the method for obtaining a nonwoven fabric by entangling fibers in a web, needle punching, water jet punching, and the like may be used. The weight per unit area of the fiber web may be appropriately set in consideration of the design of the final product, dimensional changes in subsequent processes, characteristics of processing machines, and the like.

It is also a preferred aspect to obtain a laminate sheet of a nonwoven fabric and a woven or knitted fabric formed of ultrafine fiber-generating fibers by entangling and integrating the woven or knitted fabric and the fiber entangled body formed of ultrafine fiber-generating fibers. As the method for entangling and integrating the two, methods such as needle punching and water jet punching may be used. Among these, the entangling treatment by needle punching is a preferred aspect from the viewpoint of laminating properties and product quality. It is a preferred aspect that the laminate sheet of a woven or knitted fabric and a fiber entangled body formed of ultrafine fiber-generating fibers obtained in this way is shrunk by dry heat, wet heat, or both, and further densified in the stage before an elastomer is added from the viewpoint of densification. This shrinking treatment may be performed before or after the ultrafine fibers are generated, but it is a preferred aspect to perform the shrinking treatment before the generation of ultrafine fibers from the viewpoint that the properties of the sea component polymer of the ultrafine fiber-generating fibers can be used for shrinkage. The range of area shrinkage of the laminate sheet in this shrinking process is preferably 15% or more and 35% or less. By setting the area shrinkage to 15% or more, it is possible to preferably obtain the effect of improving the quality due to shrinkage. By setting the area shrinkage to 35% or less, it is possible to leave room for shrinkage in the woven or knitted fabric integrated with the nonwoven fabric, and thus to efficiently shrink the woven or knitted fabric after an elastomer is added later. The range of area shrinkage is more preferably 1% or more and 30% or less, still more preferably 15% or more and 25% or less. As the method for measuring the area shrinkage, the shrinkage in the length direction and the shrinkage in the width direction are calculated from the length and width before and after processing in the shrinking process, and the area shrinkage is calculated by the following equation.

Length shrinkage=length after shrinking process/
length before shrinking process Width shrinkage=width after shrinking process/width
before shrinking process Area shrinkage (%)=(1−(1−length shrinkage)×(1−
width shrinkage))×100.

As the shrinking method, known methods such as hot water shrinking, steam shrinking, and dry heat shrinking may be adopted. The time and temperature for shrinking treatment may be adjusted so that the area shrinkage is acquired depending on the shrinking method to be adopted, the kind of fibers forming the fiber entangled body, and the like.

The method for producing artificial leather of the present invention includes a step of generating ultrafine fibers having an average single fiber diameter of 0.1 μm or more and 8 μm or less by treating the laminate sheet of a fiber entangled body formed of ultrafine fiber-generating fibers and a woven or knitted fabric. Examples of the method for generating ultrafine fibers include a method in which one of the resins forming the ultrafine fiber-generating fibers is dissolved in a solvent. In particular, for ultrafine fiber-generating island-in-sea composite fibers in which the sea component is composed of a readily soluble polymer and the island component is composed of a sparingly soluble polymer, a method in which the sea component is dissolved is preferable.

In a case where the sea component is polyolefins such as polyethylene and polystyrene, organic solvents such as toluene and trichlorethylene are used as solvents for dissolving the sea component. An aqueous alkali solution of sodium hydroxide or the like may be used in a case where the sea component is polylactic acid or copolyester. This ultrafine fiber-generating processing (sea removal treatment) may be performed by immersing the fiber entangled body formed of ultrafine fiber-generating fibers in a solvent and squeezing out the solution.

Next, the obtained fiber entangled body containing ultrafine fibers is subjected to a treatment for adding an elastomer. It is possible to adopt a method in which either the treatment for generating ultrafine fibers from the ultrafine fiber-generating fibers or the treatment for adding an elastomer is performed first. In the case of performing the treatment for generating ultrafine fibers first, since the elastomer grips the ultrafine fibers, the ultrafine fibers do not fall off and the like and the artificial leather can be used for a longer period of time. In the case of performing the treatment for adding an elastomer first, since a structure in which the elastomer does not grip the ultrafine fibers is formed, artificial leather with favorable texture is obtained. Which one is performed first may be appropriately selected depending on the kind of polyurethane to be used, and the like.

In a case where the elastomer is added after the treatment for generating ultrafine fibers, it is preferable to provide a step of adding a water-soluble resin between the two steps. By providing this step of adding a water-soluble resin, the surface of fibers that form a fiber bundle of ultrafine fibers and a woven or knitted fabric is protected by the water-soluble resin, a spot directly bonded to the elastomer is present intermittently rather than continuously on the surface of fibers that form a fiber bundle of ultrafine fibers and a woven or knitted fabric, and the adhesion area may be properly suppressed. As a result, it is possible to obtain artificial leather that has a favorable sense of hand holding due to the elastomer as well as soft texture, and high stretchability in the case of using a woven or knitted fabric formed of side-by-side composite fibers or the like.

As such a water-soluble resin, polyvinyl alcohol, polyethylene glycol, sugars, starch, and the like may be used. Among these, polyvinyl alcohol having a degree of saponification of 80% or more is preferably used.

Examples of the method for adding a water-soluble resin to the fiber entangled body include a method in which the fiber entangled body is impregnated with an aqueous solution of the water-soluble resin and drying is performed. As the drying conditions such as drying temperature and drying time, it is a preferred aspect to suppress the temperature of the fiber entangled body to which the water-soluble resin is added to 110° C. or less from the viewpoint of suppressing shrinkage of the woven or knitted fabric.

The amount of the water-soluble resin added is preferably 1% to 30% by mass with respect to the mass of the fiber entangled body immediately before addition. By setting the added amount to 1% by mass or more, favorable texture is acquired and favorable stretchability is acquired in the case of artificial leather fabricated using a woven or knitted fabric formed of side-by-side composite fibers or the like. By setting the added amount to 30% by mass or less, artificial leather exhibiting favorable workability and physical properties such as wear resistance is obtained. Since the amount of elastomer that can be added to the fiber entangled body increases in the subsequent steps, it is possible to increase the density of artificial leather and to achieve denser touch.

In the method for producing artificial leather of the present invention, a step of halving the fiber entangled body (precursor sheet of artificial leather) to which the elastomer is added in the plane direction may be performed. By including the halving step, the productivity of artificial leather may be improved. For example, in a case where a method in which a nonwoven fabric layer formed of ultrafine fiber-generating fibers is sandwiched between woven or knitted fabric layers is adopted as a method for laminating a woven or knitted fabric, it is a preferred aspect to halve the precursor sheet and adopt the inner surface as a napped surface as a method for achieving dense quality.

The artificial leather of the present invention preferably has naps at least on one side. The napping treatment may be performed by buffing the surface of the precursor sheet of artificial leather using sandpaper, a roll sander, or the like. In particular, by using sandpaper, uniform and dense naps may be formed. In order to form uniform naps on the surface of the precursor sheet of artificial leather, it is preferable to decrease the grinding load.

The obtained precursor sheet of artificial leather may be dyed. Dyeing is performed so that the lightness index (L* value) of the surface opposite to the design surface in the CIE1976 L*a*b* color space is within the range of the present invention. As the dyeing method, there is no particular problem with a method in which the precursor sheet of artificial leather is prepared in advance and dyed with a general dye suitable for the fiber material. At the time of dyeing, a dye that matches the fiber base material of the artificial leather may be used, disperse dyes may be used when the fiber base material is polyester fibers, and dyes that are commonly used for dyeing polyamides such as acid dyes and premetallized dyes may be used when the fiber base material is polyamide fibers.

Dyeing is preferably performed using a disperse dye, a cationic dye or another reactive dye and a high-temperature and high-pressure dyeing machine in order to soften the texture of the base material of artificial leather to be dyed.

The artificial leather of the present invention has a design surface colored with a dye and/or a pigment. This design surface is colored so that the L* value of the design surface and ΔL* that is the difference between the L* value of the design surface and the L* value of the surface opposite to the design surface satisfy the ranges regulated in the present invention. Printing techniques such as dye printing and pigment printing may be used to obtain a colored layer colored with a dye and/or a pigment on this design surface.

For dye printing, a dye that matches the fiber base material of artificial leather may be used, disperse dyes may be used when the fiber base material is polyester fibers, and dyes that are commonly used for dyeing polyamides such as acid dyes and premetallized dyes may be used when the fiber base material is polyamide fibers. As a printing method, any method such as transfer printing, screen printing, or ink jet printing may be used without limitation.

For pigment printing, a mixture of pigment and a binder resin may be used, and a urethane resin, an acrylic resin, a silicone resin and the like may be used as the binder resin, and there is no particular limitation. As a printing method, any method such as transfer printing, screen printing, or ink jet printing may be used without limitation as in dye printing.

As another method, there is no particular problem with a method in which artificial leather (base material of artificial leather) before being subjected to the formation of colored layer is prepared in advance, and then colored with a dye, a pigment and the like.

If necessary, finishing treatments using a softening agent such as silicone, an antistatic agent, a water repellent, a flame retardant, a light stabilizer and the like may be performed, and the finishing treatments may be performed after dyeing or in the same bath as that for dyeing. For flameproofing treatment, known halogen flame retardants such as bromine and chlorine and non-halogen flame retardants such as phosphorus may be used, and the flameproofing treatment may be performed by immersion after dyeing or by back coating such as knife coating or rotary screen method.

These finishing treatments may be performed before or after the formation of colored layer, but the finishing treatments are preferably performed after the formation of colored layer in order to form a uniform colored layer. These finishing agents may be processed simultaneously with the formation of colored layer, but the finishing treatments are preferably performed after the formation of colored layer in order to form a uniform colored layer as described above.

[Light-Transmitting Device]

Since the artificial leather of the present invention is light transmissive, and is thus suitably used for light-transmitting devices. The light-transmitting device includes at least one light source and the artificial leather described above at least as constituent elements, and the artificial leather is disposed on the light source. Since the artificial leather of the present invention is light transmissive, light from the light source can pass through the artificial leather of the present invention and be visually recognized.

The light source constituting the light-transmitting device of the present invention is not particularly limited, but electroluminescence light emitting diodes (LEDs) and electroluminescence (EL), which are small light sources, are preferably used since the light source is required to be built into devices. The wavelength that can be used is not particularly limited, and there is no problem as long as it is visible light at 380 nm to 780 nm. The illuminance of the light source is not particularly limited, but 2000 1x or more is preferable from the viewpoint of light transmitting properties.

In the case of being used in the light-transmitting device, the artificial leather is required to satisfy Formulas (1) to (3) at least at the part that requires light transmission, but it is possible to configure other parts that do not require light transmission as the same design surface or to have a free design with regard to the color tone of the other parts.

EXAMPLES

Next, the artificial leather of the present invention will be described more specifically using Examples, but the present invention is not limited only to these Examples. Next, evaluation methods used in Examples and measurement conditions therein will be described. However, unless otherwise described, physical properties are measured based on the above methods.

[Measurement Methods]

(1) Average Single Fiber Diameter of Ultrafine Fibers

Ultrafine fibers were observed under a scanning electron microscope (SEM) "VE-7800" manufactured by Keyence Corporation, and the average single fiber diameter was calculated.

(2) Thickness

Calculated according to JIS L1096:2010 8.4 A method as described above.

(3) Weight Per Unit Area

Calculated according to JIS L1096:2010 8.3.2 A method as described above.

(4) Lightness Index in CIE1976L*a*b* Color Space

The L*, a*, and b* values specified in 3.3 of JIS Z8781-4:2013 "Colorimetry-Part 4: CIE1976L*a*b* color space" were determined by performing measurement five times for each of the design surface and the surface (rear surface of the design surface) opposite to the design surface under conditions of CIE standard light source D65 and a viewing angle of 10° using a spectrophotometer and adopting the average values of the measured values. ΔL*, Δa*, and Δb* were determined by the following equations. For measurement, "CR-310" manufactured by Konica Minolta, Inc. was used.

$$\Delta L^* = L^*_1 - L^*_0$$

$$\Delta a^* = a^*_1 - a^*_0$$

$$\Delta b^* = b^*_1 - b^*_0$$

where $L^*_1$ is the lightness index (L* value) of the design surface in the CIE1976L*a*b* color space, $L^*_0$ is the lightness index (L* value) of the surface opposite to the design surface in the CIE1976L*a*b* color space, $\Delta L^*$ is the difference (CIELAB 1976ab lightness difference, $L^*_1 - L^*_0$) between the L* value of the design surface and the L* value of the surface opposite to the design surface, $a^*_1$ is the lightness index (a* value) of the design surface in the CIE1976L*a*b* color space, $a^*_0$ is the lightness index (a* value) of the surface opposite to the design surface in the CIE1976L*a*b* color space, $\Delta a^*$ is the difference (CIELAB 1976a* difference, $a^*_1 - a^*_0$) between the a* value of the design surface and the a* value of the surface opposite to the design surface, $b^*_1$ is the lightness index (b* value) of the design surface in the CIE1976L*a*b* color space, $b^*_0$ is the lightness index (b* value) of the surface opposite to the design surface in the CIE1976L*a*b* color space, and $\Delta b^*$ is the difference (CIELAB 1976b* difference, $b^*_1 - b^*_0$) between the b* value of the design surface and the b* value of the surface opposite to the design surface.

(5) Light Transmitting Properties

In order to confirm the light transmitting properties, as spectral transmittance measurement, the spectral transmittance (%) was measured in a band width of 5 nm and a region of 400 to 800 nm using a spectrophotometer "V-770 Model" (ISN-923 Model integrating sphere) manufactured by JASCO Corporation and "Spectralon Reflectance Standard" manufactured by Labsphere as a standard white plate.

The measurement was performed with light incident from the opposite side of the design surface (rear side of the design surface). One having a spectral transmittance of 0.2% or more was regarded to exhibit light transmitting properties and was indicated as ○ (B) in Table 1, and one having a spectral transmittance of 3.0% or more was regarded to exhibits still more favorable light transmitting properties and was indicated as ⊙ (A) in Table 1. One having a spectral transmittance of less than 0.2% was regarded not to exhibit light transmitting properties and was indicated as×(C).

(6) Texture

As texture evaluation, one having the smoothness characteristic of artificial leather was indicated as ○ (A) and one having rough texture was indicated as ×(B) in Table 1.

(7) Color Flickering on Opposite Side of Design Surface

It was visually judged whether the color on the opposite side of the design surface flickered when viewed from the design surface. One not having color flickering was indicated as ○ (A), one having slight color flickering but is practically usable was indicated as Δ (B), and one having color flickering was indicated as ×(C) in Table 1.

(8) Comprehensive Judgement

Based on the evaluation results of light transmitting properties, texture, and color flickering on the opposite side of the design surface, as comprehensive judgement, one that was preferably usable for a light-transmitting device was comprehensively judged as ⊙ (A), one that was usable for a light-transmitting device was comprehensively judged as ○ (B), and one that was not usable for a light-transmitting device was comprehensively judged as ×(C).

Example 1

<Raw Stock>

Using polyethylene terephthalate as an island component, polystyrene as a sea component, and an island-in-sea composite spinneret with 16 islands, melt spinning was performed at an island/sea mass ratio of 80/20, and then the fiber was drawn, crimped, and then cut to a length of 51 mm to obtain a raw stock of island-in-sea composite fiber.

<Laminate Sheet of Laminate Web (Nonwoven Fabric) and Woven or Knitted Fabric>

A laminate web (nonwoven fabric) was formed using the raw stock of island-in-sea composite fiber through carding and cross-lapper processes, and needle-punched at a punch number of 100/cm² to suppress fabric wrinkling caused by a rapid width change after fabric laminating. Separately, using a multifilament (84 dtex, 72 filaments) composed of a single component having an intrinsic viscosity (IV) of 0.65 and a twist number of 2500 T/m as the weft and a multifilament (84 dtex, 72 filaments) composed of a single component having an intrinsic viscosity (IV) of 0.65 and a twist number of 2500 T/m as the warp, a plain weave fabric having a warp density of 97 warps/2.54 cm and a weft density of 76 warps/2.54 cm was woven. The obtained plain weave fabric was placed on and under the above laminate web (nonwoven fabric) and laminated.

After that, needle punching was performed at a punch number (density) of 2500/cm² to obtain a laminate sheet, which had a weight per unit area of 740 g/m² and a thickness of 3.4 mm and was formed of a nonwoven fabric formed of ultrafine fiber-generating fibers and a heat shrinkable woven fabric.

<Fiber Entangled Body>

The laminate sheet obtained through the steps was shrunk by being treated with hot water at a temperature of 96° C., then impregnated with a polyvinyl alcohol (hereinafter sometimes abbreviated as PVA) aqueous solution and dried with hot air at a temperature of 110° C. for 10 minutes to obtain a sheet substrate having a PVA mass of 7.6% by mass with respect to the mass of the laminate sheet. The sheet substrate thus obtained was immersed in trichlorethylene to dissolve and remove the polystyrene of the sea component, thereby obtaining a sea-removed sheet in which ultrafine fibers having an average single fiber fineness of 4.4 μm and a plain weave fabric were entangled. The sea-removed sheet formed of a nonwoven fabric formed of ultrafine fibers and a plain weave fabric thus obtained was immersed in a dimethylformamide (hereinafter sometimes abbreviated as DMF) solution of polyurethane adjusted to have a solid concentration of 12%, and then the polyurethane was coagulated in an aqueous solution having a DMF concentration of 30%. After that, PVA and DMF were removed with hot water, and drying was performed with hot air at a temperature of 110° C. for 10 minutes to obtain a precursor sheet of fiber entangled body in which the polyurethane mass was 27% by mass with respect to the total mass of the ultrafine fibers composed of the island component and the plain weave fabric.

The precursor sheet of fiber entangled body thus obtained was halved in the thickness direction, and the nonwoven fabric layer inside the precursor sheet was halved perpendicularly to the thickness direction. The surface of the halved sheet was ground with endless sandpaper having a sandpaper count of 320 to form a napped surface on the surface layer portion, thereby obtaining a fiber entangled body having a thickness of 0.90 mm.

<Coloring Method of Design Surface and Opposite Side of Design Surface (Rear Side of Design Surface)>

The fiber entangled body thus obtained was dyed with a disperse dye in a light gray color having an L* value of 50 or more using a jet dyeing machine, then subjected to reduction washing, dried using a dryer, and then subjected to pigment printing of the design surface using a screen printer. In pigment printing, a black pigment and a urethane resin were used as binders. In this manner, a fiber entangled body having an L* value of 20.08 on the design surface and an L* value of 70.86 on the rear side of the design surface was obtained. The difference ΔL* between the L* value of the design surface and the L* value of the surface opposite to the design surface was −50.78, and the spectral transmittance was measured to be 1.5%, confirming that the fiber entangled body exhibited light transmitting properties. Since both the Δa* value and the Δb* value were within ±20 and coloring was achieved in similar colors, the color did not flicker on the opposite side of the design surface. It was confirmed that the texture was also favorable and that the fiber entangled body was preferably usable for a light-transmitting device. The results are presented in Table 1.

Example 2

<Raw Stock to Fiber Entangled Body>

The same ones as in Example 1 were used.

<Coloring Method of Design Surface and Opposite Side of Design Surface (Rear Side of Design Surface)>

The obtained fiber entangled body was dyed in the same manner as in Example 1 except that the rear side of the design surface had the L* value (gray color) presented in Table 1. Thereafter, the fiber entangled body was subjected to reduction washing, dried using a dryer, and then subjected to pigment printing of the design surface using a screen printer. In pigment printing, a gray pigment and a urethane resin were used as binders. In this manner, a fiber entangled body having an L* value of 50.34 on the design surface and an L* value of 56.53 on the rear side of the design surface was obtained. The difference ΔL* between the L* value of the design surface and the L* value of the surface opposite to the design surface was −6.19, and the spectral transmittance was measured to be 2.2%, confirming that the fiber entangled body exhibited light transmitting properties. Since both the Δa* value and the Δb* value were within ±20 and coloring was achieved in similar colors, the color did not flicker on the opposite side of the design surface. It was confirmed that the texture was also favorable and that the fiber entangled body was preferably usable for a light-transmitting device.

The results are presented in Table 1.

Example 3

<Raw Stock to Fiber Entangled Body>

The same ones as in Example 1 were used.

<Coloring Method of Design Surface and Opposite Side of Design Surface (Rear Side of Design Surface)>

The obtained fiber entangled body was dyed in the same manner as in Example 1 except that the rear side of the design surface had the L* value (light gray color) presented in Table 1. Thereafter, the fiber entangled body was subjected to reduction washing, dried using a dryer, and then subjected to dye printing of the design surface with a dark gray disperse dye using a screen printer. In this manner, a fiber entangled body having an L* value of 33.98 on the design surface and an L* value of 72.20 on the rear side of the design surface was obtained. The difference ΔL* between the L* value of the design surface and the L* value of the surface opposite to the design surface was −38.22, and the spectral transmittance was measured to be 2.7%, confirming that the fiber entangled body exhibited light transmitting properties. Since both the Δa* value and the Δb* value were within ±20 and coloring was achieved in similar colors, the color did not flicker on the opposite side of the design surface. It was confirmed that the texture was also favorable and that the fiber entangled body was preferably usable for a light-transmitting device.

The results are presented in Table 1.

Example 4

<Raw Stock to Fiber Entangled Body>

The same ones as in Example 1 were used.

<Coloring Method of Design Surface and Opposite Side of Design Surface (Rear Side of Design Surface)>

The obtained fiber entangled body was dyed in the same manner as in Example 1 except that the rear side of the design surface had the L* value (light gray color) presented in Table 1. Thereafter, the fiber entangled body was subjected to reduction washing, dried using a dryer, and then subjected to dye printing of the design surface with a gray disperse dye using a screen printer. In this manner, a fiber entangled body having an L* value of 52.44 on the design surface and an L* value of 72.20 on the rear side of the design surface was obtained. The difference ΔL* between the L* value of the design surface and the L* value of the surface opposite to the design surface was −19.76, and the spectral transmittance was measured to be 2.9%, confirming that the fiber entangled body exhibited light transmitting properties. Since both the Δa* value and the Δb* value were within ±20 and coloring was achieved in similar colors, the color did not flicker on the opposite side of the design surface. It was confirmed that the texture was also favorable and that the fiber entangled body was preferably usable for a light-transmitting device.

The results are presented in Table 1.

Example 5

<Raw Stock to Fiber Entangled Body>

The same ones as in Example 1 were used.

<Coloring Method of Design Surface and Opposite Side of Design Surface (Rear Side of Design Surface)>

Only printing with a blue pigment was performed on the design surface of the obtained fiber entangled body. In this manner, a fiber entangled body having an L* value of 36.88 on the design surface and an L* value of 88.14 on the rear side of the design surface was obtained. The difference ΔL* between the L* value of the design surface and the L* value of the surface opposite to the design surface was −51.26, and the spectral transmittance was measured to be 5.1%, confirming that the fiber entangled body exhibited light transmitting properties. The Δa* value was within ±20, but the Δb* value was 39.97 to be ±20 or more, thus the white color on the opposite side of the design surface was slightly visible from the design surface, and the color flickered. It was confirmed that the texture was favorable and that the fiber entangled body was usable for a light-transmitting device. The results are presented in Table 1.

Example 6

<Raw Stock to Fiber Entangled Body>
The same ones as in Example 1 were used.
<Coloring Method of Design Surface and Opposite Side of Design Surface (Rear Side of Design Surface)>
Only the same printing with a gray pigment as in Example 2 was performed on the design surface of the obtained fiber entangled body. In this manner, a fiber entangled body having an L* value of 50.34 on the design surface and an L* value of 88.14 on the rear side of the design surface was obtained. The difference ΔL* between the L* value of the design surface and the L* value of the surface opposite to the design surface was −37.80, and the spectral transmittance was measured to be 5.8%, confirming that the fiber entangled body exhibited light transmitting properties. Since both the Δa* value and the Δb* value were within ±20 and coloring was achieved in similar colors, the color did not flicker on the opposite side of the design surface. It was confirmed that the texture was also favorable and that the fiber entangled body was preferably usable for a light-transmitting device. The results are presented in Table 1.

Comparative Example 1

<Raw Stock to Fiber Entangled Body>
The same ones as in Example 1 were used.
<Coloring Method of Design Surface and Opposite Side of Design Surface (Rear Side of Design Surface)>
The obtained fiber entangled body was dyed with a disperse dye in a dark gray having an L* value of 50 or less using a jet dyeing machine, then subjected to reduction washing, and dried using a dryer. In this manner, a fiber entangled body having an L* value of 27.33 on both the design surface and the rear side of the design surface was obtained. The difference ΔL* between the L* value of the design surface and the L* value of the surface opposite to the design surface was 0.00, the spectral transmittance was measured to be 0.0%, and the fiber entangled body did not exhibit light transmitting properties. The Δa* value and the Δb* value were both within ±20, and the color did not flicker on the opposite side of the design surface, but the fiber entangled body did not exhibit light transmitting properties, and it was confirmed that the fiber entangled body was not usable for a light-transmitting device. The results are presented in Table 1.

Comparative Example 2

<Raw Stock to Fiber Entangled Body>
The same ones as in Example 1 were used.
<Coloring Method of Design Surface and Opposite Side of Design Surface (Rear Side of Design Surface)>
The fiber entangled body thus obtained was dyed with a disperse dye in a gray color so that the L* value was 50 or less using a jet dyeing machine, then subjected to reduction washing, dried using a dryer, and then subjected to pigment printing of the design surface with a black pigment using a screen printer. In this manner, a fiber entangled body having an L* value of 22.50 on the design surface and an L* value of 44.02 on the rear side of the design surface was obtained. The difference ΔL* between the L* value of the design surface and the L* value of the surface opposite to the design surface was −21.52, the spectral transmittance was measured to be 0.0%, and the fiber entangled body did not exhibit light transmitting properties. The Δa* value and the Δb* value were both within ±20, and the color did not flicker on the opposite side of the design surface, but the fiber entangled body did not exhibit light transmitting properties, and it was confirmed that the fiber entangled body was not usable for a light-transmitting device. The results are presented in Table 1.

Comparative Example 3

<Raw Stock to Fiber Entangled Body>
The same ones as in Example 1 were used.
<Coloring Method of Design Surface and Opposite Side of Design Surface (Rear Side of Design Surface)>
The fiber entangled body thus obtained was dyed in a dark gray by the same dyeing recipe as in Comparative Example 1 using a jet dyeing machine, then subjected to reduction washing, dried using a dryer, and then subjected to pigment printing of the design surface with a gray pigment using a screen printer. In this manner, a fiber entangled body having an L* value of 50.34 on the design surface and an L* value of 27.33 on the rear side of the design surface was obtained. The difference ΔL* between the L* value of the design surface and the L* value of the surface opposite to the design surface was 23.01, the spectral transmittance was measured to be 0.0%, and the fiber entangled body did not exhibit light transmitting properties. The Δa* value and the Δb* value were both within ±20, and the color did not flicker on the opposite side of the design surface, but the fiber entangled body did not exhibit light transmitting properties, and it was confirmed that the fiber entangled body was not usable for a light-transmitting device. The results are presented in Table 1.

TABLE 1

| | | Example 1 | Example 2 | Example 3 | Example 4 | Example 5 | Example 6 |
|---|---|---|---|---|---|---|---|
| | Thickness [mm] | 1.0 | 1.0 | 1.0 | 1.0 | 1.0 | 1.0 |
| | Weight per unit area [g/m$^2$] | 400 | 400 | 400 | 400 | 400 | 400 |
| | Average single fiber diameter [μm] | 4.4 | 4.4 | 4.4 | 4.4 | 4.4 | 4.4 |
| Design surface | Coloring method (hue) | Pigment printing (black) | Pigment printing (gray) | Dye printing (dark gray) | Dye printing (gray) | Pigment printing (blue) | Pigment printing (gray) |
| | $L^*_1$ value [—] | 20.08 | 50.34 | 33.98 | 52.44 | 36.88 | 50.34 |
| | $a^*_1$ value [—] | 0.14 | 2.56 | 2.10 | 1.23 | −1.13 | 2.56 |
| | $b^*_1$ value [—] | −0.52 | 0.45 | 1.67 | 0.12 | −36.29 | 0.45 |
| Opposite side of design surface | Coloring method (hue) | Dye jet dyeing (light gray) | Jet dyeing (gray) | Dye jet dyeing (light gray) | Dye jet dyeing (light gray) | — (white) | — (white) |
| | $L^*_0$ value [—] | 70.86 | 56.53 | 72.20 | 72.20 | 88.14 | 88.14 |
| | $a^*_0$ value [—] | 3.24 | 1.95 | 3.45 | 3.45 | −0.67 | −0.67 |

TABLE 1-continued

| | | | | | | | |
|---|---|---|---|---|---|---|---|
| b*₀ value [—] | | 2.20 | 2.72 | 2.11 | 2.11 | 3.68 | 3.68 |
| ΔL* value [—] (L*₁ − L*₀) | | −50.78 | −6.19 | −38.22 | −19.76 | −51.26 | −37.80 |
| Δa* value [—] (a*₁ − a*₀) | | −3.10 | 0.61 | −1.35 | −2.22 | −0.46 | 3.23 |
| Δb* value [—] (b*₁ − b*₀) | | −2.72 | −2.27 | −0.44 | −1.99 | −39.97 | −3.23 |
| Spectral transmittance [%] | | 1.5 | 2.2 | 2.7 | 2.9 | 5.1 | 5.8 |
| Judgement of light transmitting properties | | ○ (B) | ○ (B) | ○ (B) | ○ (B) | ⊚ (A) | ⊚ (A) |
| Texture | | ○ (A) | ○ (A) | ○ (A) | ○ (A) | ○ (A) | ○ (A) |
| Color flickering on opposite side of design surface | | ○ (A) | ○ (A) | ○ (A) | ○ (A) | Δ (B) | ○ (A) |
| Comprehensive judgement | | ⊚ (A) | ⊚ (A) | ⊚ (A) | ⊚ (A) | ○ (B) | ⊚ (A) |

| | | Comparative Example 1 | Comparative Example 2 | Comparative Example 3 |
|---|---|---|---|---|
| Thickness [mm] | | 1.0 | 1.0 | 1.0 |
| Weight per unit area [g/m²] | | 400 | 400 | 400 |
| Average single fiber diameter [μm] | | 4.4 | 4.4 | 4.4 |
| Design surface | Coloring method (hue) | Dye jet dyeing (dark gray) | Pigment printing (black) | Pigment printing (gray) |
| | L*₁ value [—] | 27.33 | 22.50 | 50.34 |
| | a*₁ value [—] | −0.95 | 0.01 | 2.56 |
| | b*₁ value [—] | −0.92 | 0.30 | 0.45 |
| Opposite side of design surface | Coloring method (hue) | Dye jet dyeing (dark gray) | Dye jet dyeing (gray) | Dye jet dyeing (dark gray) |
| | L*₀ value [—] | 27.33 | 44.02 | 27.33 |
| | a*₀ value [—] | −0.95 | 1.95 | −0.95 |
| | b*₀ value [—] | −0.92 | 2.72 | −0.92 |
| ΔL* value [—] (L*₁ − L*₀) | | 0.00 | −21.52 | 23.01 |
| Δa* value [—] (a*₁ − a*₀) | | 0.00 | −1.94 | 3.51 |
| Δb* value [—] (b*₁ − b*₀) | | 0.00 | −2.42 | 1.37 |
| Spectral transmittance [%] | | 0.0 | 0.0 | 0.0 |
| Judgement of light transmitting properties | | X (C) | X (C) | X (C) |
| Texture | | ○ (A) | ○ (A) | ○ (A) |
| Color flickering on opposite side of design surface | | ○ (A) | ○ (A) | ○ (A) |
| Comprehensive judgement | | X (C) | X (C) | X (C) |

As presented in Table 1, the artificial leather of Examples 1 to 6 had a spectral transmittance of 0.2% or more and exhibited light transmitting properties. On the other hand, the artificial leather of Comparative Examples 1 to 3 all had a spectral transmittance of 0.0% and did not exhibit light transmitting properties. In particular, Example 1 deserves special mention in that the artificial leather exhibited favorable light transmitting properties in spite of having a dark black design surface equal to or greater than that of Comparative Example 1.

The invention claimed is:

1. Artificial leather comprising:
   a fiber entangled body formed of ultrafine fibers having an average single fiber diameter of 0.1 μm or more and 8 μm or less; and
   an elastomer as constituent elements,
   wherein the artificial leather has a thickness of 0.4 mm or more and 1.2 mm or less and a weight per unit area of 80 g/m² or more and 450 g/m² or less, and one surface of the artificial leather is a design surface colored with a dye and/or a pigment and satisfies the following Formulas (1) to (3):

$$L^*_1 \leq 55 \ldots \quad (1)$$

$$L_0 > 50 \ldots \quad (2)$$

$$\Delta L^* < -5 \ldots \quad (3)$$

where $L^*_1$ is a lightness index (L* value) of the design surface in CIE1976L*a*b* color space, $L^*_0$ is a lightness index (L* value) of a surface opposite to the design surface in CIE1976L*a*b* color space, ΔL* is a difference (CIELAB 1976ab lightness difference, $L^*_1 - L^*_0$) between the L* value of the design surface and the L* value of the surface opposite to the design surface, and the lightness index is a value measured under conditions of CIE standard light source D65 and a viewing angle of 10°, and
   wherein the artificial leather has a spectral transmittance of 0.2% or greater, where the spectral transmittance is measured in a band width of 5 nm and a region of 400 to 800 nm using a spectrophotometer V-770 Model (ISN-923 Model integrating sphere) manufactured by JASCO Corporation and Spectralon Reflectance Standard manufactured by Labsphere as a standard white plate.

2. The artificial leather according to claim 1, wherein the fiber entangled body is dyed with a dye.

3. A light-transmitting device comprising at least one light source and the artificial leather according to claim 1 at least as constituent elements,
   wherein the artificial leather is disposed on the light source.

4. A light-transmitting device comprising at least one light source and the artificial leather according to claim 2 at least as constituent elements,
   wherein the artificial leather is disposed on the light source.

5. The artificial leather according to claim 1, wherein the ultrafine fibers are in the form of a short fiber nonwoven fabric.

* * * * *